:::

(12) United States Patent
Hu et al.

(10) Patent No.: US 9,435,928 B2
(45) Date of Patent: Sep. 6, 2016

(54) LIGHT GUIDING SYSTEM, EDGE-LIGHTING BACKLIGHT MODULE AND LCD DEVICE

(71) Applicant: Shenzhen China Star Optoelectronics Technology Co., Ltd., Shenzhen, Guangdong (CN)

(72) Inventors: Che-chang Hu, Shenzhen (CN); Kuang-yao Chang, Shenzhen (CN); Chao Ning, Shenzhen (CN); Yong Fan, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 613 days.

(21) Appl. No.: 13/819,342

(22) PCT Filed: Jan. 17, 2013

(86) PCT No.: PCT/CN2013/070633
§ 371 (c)(1),
(2) Date: Feb. 27, 2013

(87) PCT Pub. No.: WO2014/110770
PCT Pub. Date: Jul. 24, 2014

(65) Prior Publication Data
US 2015/0293293 A1    Oct. 15, 2015

(30) Foreign Application Priority Data
Jan. 16, 2013  (CN) .......................... 2013 1 0016244

(51) Int. Cl.
*F21V 7/04* (2006.01)
*F21V 8/00* (2006.01)

(52) U.S. Cl.
CPC ........... *G02B 6/0028* (2013.01); *G02B 6/0066* (2013.01); *G02B 6/0031* (2013.01); *G02B 6/0035* (2013.01); *G02B 6/0055* (2013.01)

(58) Field of Classification Search
CPC ............ G02F 1/133606; G02B 6/001; G02B 6/0008
USPC .......................................................... 362/609
See application file for complete search history.

(56) References Cited

U.S. PATENT DOCUMENTS

| | | | | |
|---|---|---|---|---|
| 6,139,163 A * | 10/2000 | Satoh | ................... | G02B 6/0018 362/298 |
| 6,369,866 B1 * | 4/2002 | Rai | ........................ | G02B 6/003 349/57 |
| 6,486,931 B1 * | 11/2002 | Ueda | .................... | G02B 6/0043 349/64 |
| 7,213,955 B1 * | 5/2007 | Ladouceur | ........... | G02B 6/0028 349/63 |
| 2006/0239032 A1 | 10/2006 | Ohkawa | | |
| 2007/0019438 A1 * | 1/2007 | Haenen | ................ | G02B 6/0048 362/621 |

FOREIGN PATENT DOCUMENTS

| | | | | |
|---|---|---|---|---|
| CN | 101782698 A | 2/2009 | | |
| CN | 101782698 A | 7/2010 | | |
| CN | 202452315 U | 9/2012 | | |
| GB | 2246231 A | * | 1/1992 | ........... G02B 6/0028 |
| KR | 1020110057528 A | 6/2011 | | |

\* cited by examiner

*Primary Examiner* — Jason Mood Han
*Assistant Examiner* — Omar Rojas Cadima
(74) *Attorney, Agent, or Firm* — Andrew C. Cheng

(57) ABSTRACT

A light guiding system includes an ambient light gathering system, multiple light guiding devices and a wedge light guiding bar. The ambient light gathering system facing ambient light is used for absorbing the ambient light. Each light guiding device absorbs the absorbed light. The wedge light guiding bar has a light-out surface and a light-in surface coupled to the light-out surface. The light-in surface is a wide surface coupled to an inclined surface. The light-out surface is opposite to the inclined surface and next to a light-in side of a light guide plate. The wedge light guiding bar for use in the light guiding system, an edge-lighting backlight module and an LCD device can reduce cost of material and weight. Also, the light uniformity of the light output end is improved and the optical quality of the edge-lighting backlight module is raised.

15 Claims, 4 Drawing Sheets

LIGHT GUIDING SYSTEM, EDGE-LIGHTING BACKLIGHT MODULE AND LCD DEVICE

BACKGROUND OF THE INVENTION

1. Field of the Invention

The present invention relates to a liquid crystal display (LCD) field, more particularly, to a light guiding system, an edge-lighting backlight module and an LCD device.

2. Description of the Prior Art

The popular backlight from a backlight module of a TFT-LCD device is light emitting diode (LED) or fluorescent tube. Both lighten by power, and the percentage of the energy consumption from the backlight in the whole backlight module is around 80 so that it consumes energy tremendously in the long term. Therefore, it results in the greenhouse effect and the nuclear pollution because of the main power generations, such as oil and coal burning and nuclear energy.

Ambient light in nature, like sunlight, is environmental and natural resource. The spectrum of the ambient light comprises visible light which backlight needs, and a design of a backlight module gathers sunlight by an ambient light gathering system and guides the light taken as backlight to the backlight module by a light guiding device, such as optical fiber. Therefore, it saves energy consumption enormously.

As FIG. 1 shows, FIG. 1 is a structure diagram of a light guiding system of an edge-lighting backlight module in the prior art. A light guiding system 1 absorbs ambient light CL and generates absorbed light SL by an ambient light gathering system 10. The absorbed light SL is guided into a plurality of optical fibers 20 whose a light output end 21 adjacent to a light-in side 31 of a light guide plate (light guide plate) 30, the light from each light output end 21 passes the light-in side 31 to the light guide plate 30, and then the light mixed evenly in the light guide plate 30 emits from a light-out side 33. In hence, the light from the light output end 21 is taken as a backlight of the backlight module 1.

The main problem that the structure of the conventional edge-lighting backlight module is optical uniformity on the light-in side 31 of the light guide plate 30 because a larger interval between two adjacent light output ends 21 in the arrangement of the plurality of optical fibers 20 adjacent to the light-in side 31 of the light guide plate 30 caused by a smaller light-out angle of the light output end 21 in the optical fiber 20 (within 60 degrees in general). Therefore, the optical uniformity deteriorates an optical quality. It needs more optical fibers 20 if an interval between two adjacent light output ends 21 reduces. If so, it increases costs and manufacturing difficulty.

SUMMARY OF THE INVENTION

It is therefore one of the primary objectives of the claimed invention to provide a light guiding system for use in an edge-lighting backlight module to solve the above-mentioned problems.

According to the present invention, a light guiding system for use in an edge-lighting backlight module comprises an ambient light gathering system, a plurality of light guiding devices, and a wedge light guiding bar. The light guiding system facing to ambient light is used for absorbing the ambient light to generate absorbed light. Each light guiding device has a light input end and a light output end near to the ambient light gathering system, and the absorbed light from the light input end being guided to the light output end. The wedge light guiding bar has a light-out surface facing a light-in side of a light guide plate, an inclined surface opposite to the light-out surface, and a light-in surface which is a wide surface coupled to the light-out surface and the inclined surface, and is near the light out end of the plurality of light guiding devices.

According to the present invention, an edge-lighting backlight module comprises a light guide plate, a back plate, an optical film, and a light guiding system. The light guide plate comprises a light-in side, a bottom side and a light-out side. The bottom side and the light-out side are opposite to each other and coupled to the light-in side. The back bezel is disposed under the bottom side. The optical film is disposed over the light-out side. The light guiding system comprises an ambient light gathering system, a plurality of light guiding devices, and a wedge light guiding bar. The light guiding system facing to ambient light is used for absorbing the ambient light to generate absorbed light. Each light guiding device has a light input end and a light output end near to the ambient light gathering system, and the absorbed light from the light input end being guided to the light output end. The wedge light guiding bar has a light-out surface facing the light-in side of the light guide plate, an inclined surface opposite to the light-out surface, and a light-in surface which is a wide surface coupled to the light-out surface and the inclined surface, and is near the light out end of the plurality of light guiding devices.

According to the present invention, a liquid crystal display device comprises a light guide plate, a back plate, an optical film, a display panel, and a light guiding system. The light guide plate comprises a light-in side, a bottom side and a light-out side. The bottom side and the light-out side are opposite to each other and coupled to the light-in side. The back bezel is disposed under the bottom side. The optical film is disposed over the light-out side. The display panel is disposed over the optical film. The light guiding system comprises an ambient light gathering system, a plurality of light guiding devices, and a wedge light guiding bar. The light guiding system facing to ambient light is used for absorbing the ambient light to generate absorbed light. Each light guiding device has a light input end and a light output end near to the ambient light gathering system, and the absorbed light from the light input end being guided to the light output end. The wedge light guiding bar has a light-out surface facing the light-in side of the light guide plate, an inclined surface opposite to the light-out surface, and a light-in surface which is a wide surface coupled to the light-out surface and the inclined surface, and is near the light out end of the plurality of light guiding devices.

In one aspect of the present invention, the light guiding device is an optical fiber.

In another aspect of the present invention, reflectors are disposed on the inclined surface, a narrow surface opposite to the light-in surface, a bottom surface coupled to the inclined surface and a top surface opposite to the bottom surface.

In another aspect of the present invention, a plurality of cylindrical nodes are set up on the inclined surface.

In still another aspect of the present invention, a plurality of semisphere nodes are set up on the inclined surface.

In yet another aspect of the present invention, the wedge light guiding bar is made of polymethyl methacrylate (PMMA).

In contrast to the prior art, the light guiding system, the edge-lighting backlight module and the LCD device of the present invention arrange light output ends of a plurality of optical fibers near a wide light-in surface of a wedge light guiding bar, while no optical fiber is disposed near a narrow surface opposite to the wide light-in surface, thereby saving materials and reducing weight of the light guiding system, the edge-lighting backlight module and the LCD device. Furthermore, there is a certain angle between an inclined surface of the wedge light guiding bar and the most incident light to the wedge light guiding bar, so that the light tends to emit to nodes on the inclined surface and to be scattered. Therefore, it reduces loss of light by lessening traveling routes inside the wedge light guiding bar. Besides, light can evenly emit from the plurality of optical fibers into the light guide plate because of an appropriate design for a shape and an arrangement of the nodes within the wedge light guiding bar, thereby improving uniformity of lightness on the light-in side and enhancing the optical quality on the edge-lighting backlight module.

DETAILED DESCRIPTION OF THE PREFERRED EMBODIMENTS

In order to illustrate the technique and effects of the present invention, a detailed description will be disclosed by the following disclosure in conjunction with figures. Please note, the same components are labeled by the same number.

Figure 1:
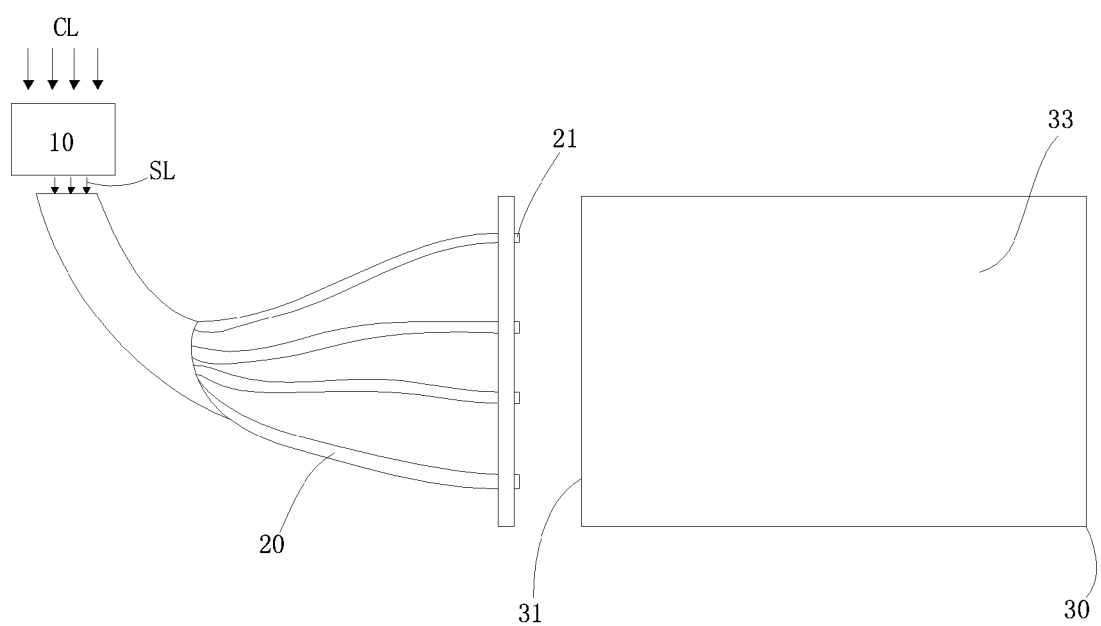
FIG. 1 is a structure diagram of a conventional edge-lighting backlight module.
Figure 2:
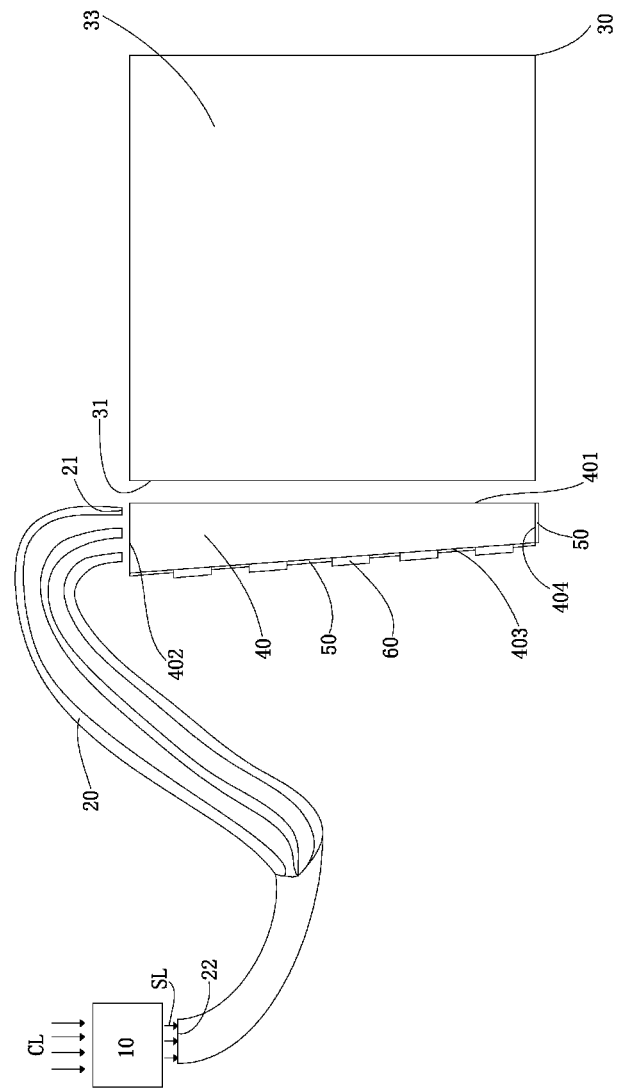
FIG. 2 is a diagram of a light guiding system according to the embodiment of the present invention.
Figure 3:
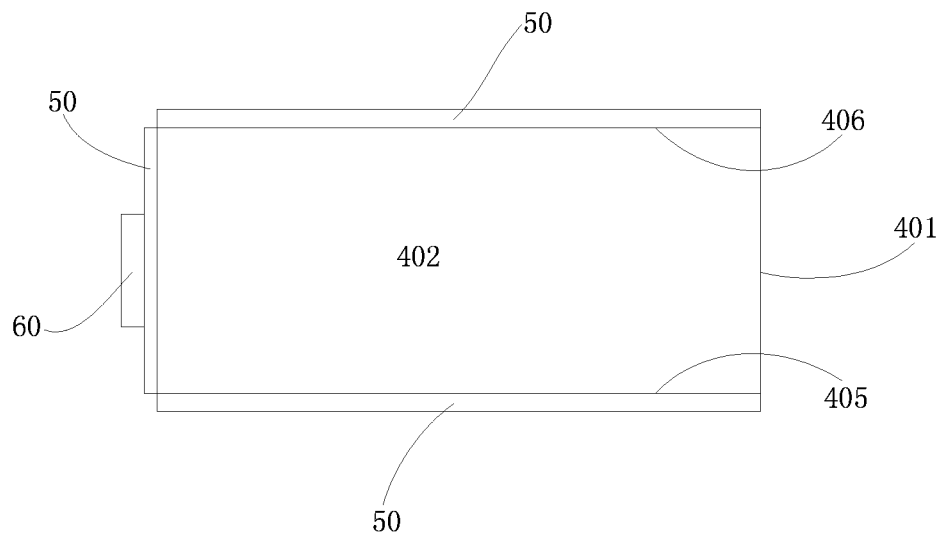
FIG. 3 shows a front view of a wide surface of a light guiding bar according to the embodiment of the present invention.

Please refer to FIG. 2 in conjunction with FIG. 3. The light guiding system 1 comprises an ambient light gathering system 10, a plurality of optical fibers 20 and a wedge light guiding bar 40. Specifically, the ambient light gathering system 10 faces, absorbs ambient light CL and converts the ambient light CL into absorbed light SL. It is noted that the ambient light can be sunlight, lamplight or lights from other luminous objects, and wavelength of the absorbed light SL is in a range of visible lights which means the absorbed light SL is qualified as a backlight in the backlight module. Each optical fiber 20 has a light output end 21 and a light input end 22, and the light input end 22 of each optical fiber 20 assembles to a bunch close to the ambient light gathering system 10. The light guide plate 30 has a light-in side 31 and a light-out side 33. Light is incident to the light-in side 31 and then emitted from the light-out side 33 after a mixture in the light guide plate 30. The wedge light guiding bar 40 has a light-out surface 401 facing the light-in side 31, an inclined surface 403 opposite to the light-out surface 401, and a light-in surface 402 which is a wide surface coupled to the light-out surface 401 and the inclined surface 403. The wedge light guiding bar 40 may be made of polymethyl methacrylate (PMMA) or others.

The light output end 21 of each optical fiber 20 is disposed nearby the light-in surface 402. It is noticed that a number and arrangement of the light output ends 21 depend on practical situation but not been limited as FIG. 2 shows. Less energy loss of light in the optical fibers 20 which means an excellent light guiding device assures sufficient light to reach the light output end 21 when the absorbed light SL from the ambient light gathering system 10 emits to the optical fibers 20 through the light input ends 22 of the plurality of optical fibers 20 and is guided to the light output end 21. The light passing from the light input end 21 through the wedge light guiding bar 40 emits from the light-out surface 401 after a mixture in the wedge light guiding bar 40.

The wedge light guiding bar 40 further comprises a narrow surface 404 opposite to and narrower than the light-in surface 402, a bottom surface 405 and a top surface 406. The bottom surface 405 and the top surface 406 are disposed oppositely and coupled to the inclined surface 403. In order that the light through the wedge light guiding bar 40 emits optimally from the light-in surface 401, reflectors 50 disposed on the inclined surface 403, the narrow surface 404, the bottom surface 405, and the top surface 406 are used for reflecting the incident light to the wedge light guiding bar 40 to make more light emit from the light-out surface 401.

The reflector 50 can be a metal reflector or a medium reflector. The metal reflector can be made by material with high reflectivity in visible light wavelength, such as silver, gold, aluminum, etc. The medium reflector can be made by material with high refractivity film layer such as $TiO_2$, $HfO_2$, $ZrO_2$, etc, or by material with low refractivity film layer such as $SiO_2$, $Al_2O_3$, etc.

A plurality of nodes 60 are disposed on the inclined surface 403 to make the light from the light-out surface 401 emit evenly. The nodes 60 scatters the light from the light-in surface 402, and most of the scattered light reflected several times inside the wedge light guiding bar 40 eventually emits from the light-out surface 401. The appropriate design of arrangement for nodes 60 makes the light from the light-out surface 401 more evenly, the even light mixed in the light guide plate 30 through the light-in side 31 emits from the light-out side 33, and the light from the light-out side 33 appears more even. Furthermore, each node 60 is, but not limited to be, shaped as a cylindrical.

Figure 4:
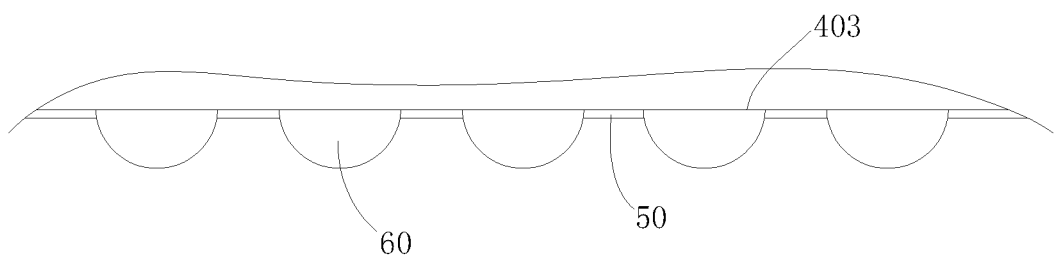
FIG. 4 illustrates another shape diagram of nodes on an inclined surface of a light guiding bar according to the embodiment of the present invention.

Please refer to FIG. 4, each node 60 also can be shaped as a semisphere, a pyramidal or others.

The light guiding system of the embodiment is usually applied to a edge-lighting backlight module in the LCD device. The following is a description of the edge-lighting backlight module and the LCD device of the light guiding system of the embodiment.

Figure 5:
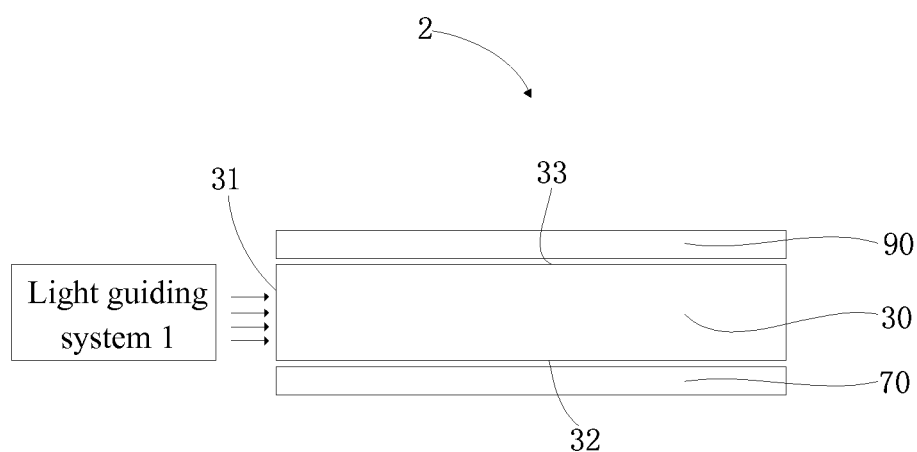
FIG. 5 shows a diagram of an edge-lighting backlight module according to the embodiment of the present invention.

Please refer to FIG. 5, FIG. 5 shows an edge-lighting backlight module 2 comprising a back bezel 70, a light guide plate 30, an optical film 90, and the light guiding system 1 of the above-mentioned embodiment. The light guide plate 30 comprises a light-in side 31, a bottom side 32 coupled to the light-in side 31 and the light-out side 33 opposite to the bottom side 32. The back bezel 70 is set up beneath the bottom side 32, and the optical film 90 is set up above the top side 33. The even light from the light guiding system 1 mixed in the light guide plate 30 through the light-in side 31 emits from the light-out side 33.

Figure 6:
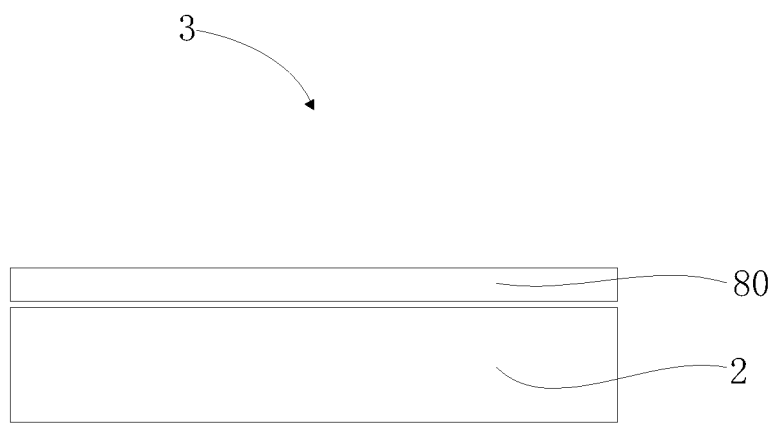
FIG. 6 shows a diagram of an LCD device according to the embodiment of the present invention.

Please refer to FIG. 6, a display panel 80 is disposed above the edge-lighting backlight module 2 and the edge-lighting backlight module 2 form an LCD device 3. The edge-lighting backlight module 2 provides light to the display panel 80 for displaying images.

In summary, the light guiding system, the edge-lighting backlight module and the LCD device of the present invention arrange light output ends of a plurality of optical fibers near a wide light-in surface of a wedge light guiding bar, while no optical fiber is disposed near a narrow surface opposite to the wide light-in surface, thereby saving materials and reducing weight of the light guiding system, the edge-lighting backlight module and the LCD device. Furthermore, there is a certain angle between an inclined surface of the wedge light guiding bar and the most incident light to the wedge light guiding bar, so that the light tends to emit to nodes on the inclined surface and to be scattered. Therefore, it reduces loss of light by lessening traveling routes inside the wedge light guiding bar. Besides, light can evenly emit from the plurality of optical fibers into the light guide plate because of an appropriate design for a shape and an arrangement of the nodes within the wedge light guiding bar, thereby improving uniformity of lightness on the light-in side and enhancing the optical quality on the edge-lighting backlight module.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light guiding system for use in an edge-lighting backlight module comprising:
    an ambient light gathering system, facing to ambient light, for absorbing the ambient light to generate absorbed light;
    a plurality of light guiding devices, each light guiding device having a light input end and a light output end near to the ambient light gathering system, and the absorbed light from the light input end being guided to the light output end; and
    a wedge light guiding bar having a light-out surface, a light-in surface, an inclined surface, and a first surface, wherein the light-out surface is connected to the light-in surface, the inclined surface is a single surface remaining a specific angle, is adjacent to and directly connected between the first surface and light-in surface, and is opposite to the light-out surface, and the light-in surface is wider than the first surface and is near the light out end of the plurality of light guiding devices,
    wherein a plurality of cylindrical nodes are set up on the inclined surface and protrude from the inclined surface; wherein the plurality of cylindrical nodes are arranged to scatter light from the light-in surface so as to make the light from the light-out surface more even.

2. The light guiding system of claim 1, wherein the light guiding device is an optical fiber.

3. The light guiding system of claim 1, wherein reflectors are disposed on the inclined surface, a narrow surface opposite to the light-in surface, a bottom surface coupled to the inclined surface and a top surface opposite to the bottom surface.

4. The light guiding system of claim 1, wherein a plurality of semisphere nodes are set up on the inclined surface.

5. The light guiding system of claim 1, wherein the wedge light guiding bar is made of polymethyl methacrylate (PMMA).

6. An edge-lighting backlight module comprising:
    a light guide plate, comprising a light-in side, a bottom side and a light-out side being opposite to each other and coupled to the light-in side;
    a back bezel, disposed under the bottom side;
    an optical film, disposed over the light-out side; and
    a light guiding system comprising:
        an ambient light gathering system, facing to ambient light, for absorbing the ambient light to generate absorbed light;
        a plurality of light guiding devices, each light guiding device having a light input end and a light output end near to the ambient light gathering system, and the absorbed light from the light input end being guided to the light output end; and
        a wedge light guiding bar having a light-out surface, a light-in surface, an inclined surface, and a first surface, wherein the light-out surface is connected to the light-in surface, the inclined surface is a single surface remaining a specific angle, is adjacent to and directly connected between the first surface and light-in surface, and is opposite to the light-out surface, and is directly connected between the first surface and light-in surface and is opposite to the light-out surface, and the light-in surface is wider than the first surface and is near the light out end of the plurality of light guiding devices,
        wherein a plurality of cylindrical nodes are set up on the inclined surface and protrude from the inclined surface; wherein the plurality of cylindrical nodes are arranged to scatter light from the light-in surface so as to make the light from the light-out surface more even.

7. The edge-lighting backlight module of claim 6, wherein the light guiding device is an optical fiber.

8. The edge-lighting backlight module of claim 6, wherein reflectors are disposed on the inclined surface, a narrow surface opposite to the light-in surface, a bottom surface coupled to the inclined surface and a top surface opposite to the bottom surface.

9. The edge-lighting backlight module of claim 6, wherein a plurality of semisphere nodes are set up on the inclined surface.

10. The edge-lighting backlight module of claim 6, wherein the wedge light guiding bar is made of polymethyl methacrylate (PMMA).

11. A liquid crystal display device comprising:
    a light guide plate, comprising a light-in side, a bottom side and a light-out side being opposite to each other and coupled to the light-in side;
    a back bezel, disposed under the bottom side;
    an optical film, disposed over the light-out side;
    a display panel, disposed over the optical film; and
    an edge-lighting backlight module comprising:
        an ambient light gathering system, facing to ambient light, for absorbing the ambient light to generate absorbed light;
        a plurality of light guiding devices, each light guiding device having a light input end and a light output end near to the ambient light gathering system, and the absorbed light from the light input end being guided to the light output end; and
        a wedge light guiding bar having a light-out surface, a light-in surface, an inclined surface, and a first surface, wherein the light-out surface is connected to the light-in surface, the inclined surface is a single surface remaining a specific angle, is adjacent to and directly connected to the first surface and light-in surface, and is opposite to the light-out surface, and the light-in surface is wider than the first surface and is near the light out end of the plurality of light guiding devices, wherein a plurality of cylindrical nodes are set up on the inclined surface and protrude from the inclined surface; wherein the plurality of cylindrical nodes are arranged to scatter light from the light-in surface so as to make the light from the light-out surface more even.

12. The liquid crystal display device of claim 11, wherein the light guiding device is an optical fiber.

13. The liquid crystal display device of claim 11, wherein reflectors are disposed on the inclined surface, a narrow surface opposite to the light-in surface, a bottom surface coupled to the inclined surface and a top surface opposite to the bottom surface.

14. The liquid crystal display device of claim 11, wherein a plurality of semisphere nodes are set up on the inclined surface.

15. The liquid crystal display device of claim 11, wherein the wedge light guiding bar is made of polymethyl methacrylate (PMMA).

* * * * *